United States Patent
Ödblom

(10) Patent No.: US 12,030,520 B2
(45) Date of Patent: Jul. 9, 2024

(54) METHOD AND SYSTEM FOR VALIDATING AUTONOMOUS CONTROL SOFTWARE FOR A SELF-DRIVING VEHICLE

(71) Applicant: Volvo Car Corporation, Gothenburg (SE)

(72) Inventor: Anders Ödblom, Bohus-Björkö (SE)

(73) Assignee: VOLVO CAR CORPORATION, Gothenburg (SE)

( * ) Notice: Subject to any disclaimer, the term of this patent is extended or adjusted under 35 U.S.C. 154(b) by 409 days.

(21) Appl. No.: 17/399,738

(22) Filed: Aug. 11, 2021

(65) Prior Publication Data

US 2022/0048533 A1 Feb. 17, 2022

(30) Foreign Application Priority Data

Aug. 17, 2020 (EP) ..................... 20191253

(51) Int. Cl.
*B60W 60/00* (2020.01)
*G08G 1/01* (2006.01)

(52) U.S. Cl.
CPC ......... *B60W 60/001* (2020.02); *G08G 1/0129* (2013.01); *G08G 1/0133* (2013.01); *B60W 2554/4049* (2020.02)

(58) Field of Classification Search
CPC ........ B60W 60/001; B60W 2554/4049; G08G 1/0129; G08G 1/0133
USPC .......................................................... 701/23
See application file for complete search history.

(56) References Cited

U.S. PATENT DOCUMENTS

| 2019/0303759 A1 | 10/2019 | Farabet et al. | |
| 2019/0354643 A1* | 11/2019 | Shum | G06F 30/20 |
| 2021/0096571 A1* | 4/2021 | Modalavalasa | G06V 20/58 |
| 2021/0237772 A1* | 8/2021 | Meltz | G06F 30/20 |

FOREIGN PATENT DOCUMENTS

WO 2019/234726 A1 12/2019

OTHER PUBLICATIONS

Extended European Search Report for European Application No. 20191253.2 dated Feb. 5, 2021, 9 pages.
Leitner, et al., "Challenges for reproducing real-life test runs in simulation for validating automated driving functions", Elektrotechnik Und Informationstechnik, Springer Verlag, Wien, AT, vol. 135, No. 4, Jul. 12, 2018 (Jul. 12, 2018), pp. 360-364, XP036551863, ISSN: 0932-383X, DOI: 10.1007/S00502-018-0628-1 [retrieved on Jul. 12, 2018]. Abstract, paragraphs [0002], [0003], [02.3] and [3.2.4].

* cited by examiner

*Primary Examiner* — Isaac G Smith
(74) *Attorney, Agent, or Firm* — Amin, Turocy & Watson, LLP

(57) ABSTRACT

Method and system for validating an automated control software, ACS, for a vehicle, wherein the ACS is adapted for operating a vehicle in autonomous driving mode. The method comprises simulating use of the ACS in agent movement scenarios, wherein said simulating includes providing input sensor data to each vehicle agent to which an ACS has been assigned, and wherein movement of each of the other agents in the simulation is controlled to move either according to a replay of a corresponding real-world agent, or by an agent movement model.

20 Claims, 8 Drawing Sheets

METHOD AND SYSTEM FOR VALIDATING AUTONOMOUS CONTROL SOFTWARE FOR A SELF-DRIVING VEHICLE

TECHNICAL FIELD

The present invention relates to a method and system for validating whether an autonomous control software for operating a vehicle, in particular an on-road vehicle, in autonomous drive mode is safe to use.

BACKGROUND ART

An autonomous drive system, ADS, comprises hardware and software that together are capable of performing an entire dynamic driving task on a sustained basis. The hardware forms part of the vehicle and typically comprises actuators for steering the vehicle, sensors for sensing objects and agents in the vicinity of the vehicle, and a controller adapted for controlling motor output of the vehicle. The hardware is controlled by software, called autonomous control software, ACS, which usually is stored in a computer-readable memory of the vehicle.

Examples of objects that may be sensed by sensors of the vehicle include static objects, i.e. objects that are not expected to move in the real-world, such as trees, roads and road markings, lamp posts, buildings, boxes, boards, stones, pot holes, trash and the like. Examples of agents include non-static objects, such as pedestrians and animals, as well as other vehicles, such as cars, trucks, buses, bicycles and motorcycles. Systems and software for distinguishing static objects from agents are known in the art.

Generally, six levels of driving automation are defined, of which levels 3, 4 and 5 are defined as follows in Table 1:

TABLE 1

| Driving automation level | Description |
| --- | --- |
| Level 3: | Conditional driving automation defined as the sustained and operational design domain (ODD)—specific performance by an ADS of the entire dynamic driving task (DDT) with the expectation that the DDT fallback user is receptive to ADS issued request to intervene, as well as to DDT performance-relevant system failures in other vehicle systems, and will respond appropriately. |
| Level 4: | High driving automation defined as the sustained and operational design domain (ODD)—specific performance by an ADS of the entire dynamic driving task (DDT) and DDT fallback without any expectation that a user will respond to a request to intervene. |
| Level 5: | Full driving automation defined as the sustained and unconditional (i.e. not ODD specific) performance of the ADS of the entire DDT and DDT fallback without any expectation that a user will respond to a request to intervene. |

Validating an ACS for operating a vehicle in autonomous driving mode according to level 3, 4 or 5 is challenging due to the extensive amount of driving that is needed to prove that the ACS for a vehicle is safe with sufficient confidence. A critical aspect to prove the ACS safe is to demonstrate it can sufficiently safely handle many different scenarios that it might be exposed to.

A known method for evaluating control features of an autonomous vehicle for development or validation purposes, includes using sensors of a vehicle to generate a real-world sensor data set, generating perturbations of the real world sensor data set, generating a 3-dimensional object data set from the real-world sensor data set, and generating perturbations of the 3-dimensional object data set. According to the known method, for evaluation of a control feature that is to be validated, such as an algorithm or software, the 3-dimensional object data set including the perturbations is used in executing the control feature.

The known method allows autonomous control software of an ADS to be tested and validated using the perturbated 3-dimensional object data that are generated from real world sensor data set. The 3-dimension object data may include 3-dimensional voxel representations of vehicles, pedestrians, traffic lights, and so on. However, the manner in which the 3-dimensional object data is generated and perturbed can result in unlikely scenarios, which in turn affects the reliability of the validation.

It is an object of the invention to provide a method and system for validation of autonomous control software for operating a vehicle in autonomous driving mode, in which this drawback is at least partially overcome.

SUMMARY OF THE INVENTION

According to a first aspect, the invention provides a method for validating autonomous control software, ACS, for operating a vehicle in autonomous driving mode, wherein the ACS is adapted for, based on input sensor data about the surroundings of the vehicle and on static world representation data, outputting control signals for autonomously driving the vehicle, wherein a real-world scenario database is provided comprising a number of real-world scenarios, wherein each real-world scenario is based on static world representation data regarding a real-world area and on time series agent movement data about one or more real-world agents moving in the real-world area, wherein the real-world agents include one or more real-world vehicle agents, and wherein the time series data includes time series data about the position of the agents;

the method comprising:
based on the plurality of stored real-world scenarios, generating a number of agent movement scenarios, wherein each agent movement scenario comprises static world representation data of a corresponding real-world scenario; and
carrying out a simulation of each agent movement scenario over time, comprising for each simulation:
initializing the agent movement scenario with virtual agents in accordance with a real-world scenario sampled from the real-world scenario database, and assigning the ACS to one or more of said real-world or virtual vehicle agents to control driving thereof in the simulation;
simulating the agent scenario over time and determining a safety score for the simulated agent scenario in which the ACS is used, wherein said simulating includes providing as an input sensor data to each vehicle agent in the simulation to which an ACS has been assigned;

determining, for each simulated scenario, whether a similar scenario is present in a virtual scenario database, and if not, storing the simulated virtual scenario in the virtual scenario database;

validating the ACS as safe if an aggregate function of the safety scores for the simulated virtual scenarios stored in the virtual scenario database is within a predetermined range, and otherwise not validating the ACS as safe.

The real-world database typically stores hundreds of thousand, or more, real-world scenarios.

According to the method at the start of a simulation an agent movement scenario is initialized according to a real-world scenario, e.g. the initialized scenario has the same static world representation as in the real-world scenario, with the same static objects at same positions, which does not change during the simulation. The initialized scenario also has a same number of agents at corresponding initial positions, each agent in the initialized agent movement scenario having a same acceleration, velocity and orientation as a corresponding agent at a point in time in the corresponding real-world scenario. After the agent movement scenario has been initialized in this manner, movement of each agent in the scenario during the simulation is controlled either by:

i. an ACS
ii. an agent movement model; and/or
iii. as a complete or partial replay of the movement of a corresponding real-world agent in the real-world scenario on which the simulation is based.

This results in highly realistic movement of agents during a simulation, as starting conditions of the simulation and conditions during simulation are close to conditions in the real-world scenario. In particular, the static world representation data with which the agent movement scenario has been initialized will typically remain constant through simulation of the scenario.

It is noted that at the start of a simulation, movement of one or more of the agents may be controlled as a partial replay of a corresponding real-world agent, whereas the same agent in the simulation may later on be controlled by an agent movement model or an ACS.

Additionally, the method of the invention ensures that during the simulation each vehicle to which an ACS is assigned is provided with input sensor data, e.g. simulated input sensor data that could likely be generated by the real-world sensors and is based on real-world sensor data. By using sensor data during the simulation, as an input for the ACS, that is highly similar to, or equal to, real-world sensor data, the method of the invention allows accurate validation of whether an ACS is safe.

The input sensor data about the surroundings comprises information on static objects as sensed by real-world sensors, wherein the static objects are sensed for instance within a radius of 1 km of the vehicle that is controlled by the ACS, or within a line of sight of said vehicle. In particular, the input sensor data may comprise data received from sensors that are mounted on the vehicle, such as cameras, Lidars, radars, ultrasound sensors, and/or GPS sensors. The simulation is carried out using information on static objects as was sensed by real-world sensors, without converting this information to a 3-dimensional model which is subsequently perturbed. The sensor data that an ACS in a simulation will receive about the static objects will thus be very similar to sensor data that was recorded by actual sensors.

The input sensor data about the surroundings further includes information on agents, which may be real-world agents, virtual agents, or both, the agents being adapted for dynamically moving relative to the static world in the vehicle's surroundings e.g. agents within a radius of 1 km of the vehicle that is controlled by the ACS, or within a line of sight thereof. Examples of agents include animals, pedestrians, cyclists, motorists and other (road) vehicles that may move in the vicinity of the vehicle. Preferably, at least one of the real-world agents for which the time series data is received is a real-world vehicle, such as a car, bus or truck, so that during the simulation a corresponding agent can move in a substantially same manner as the real-world agent. This allows real-world movement of real-world vehicle(s) to be replayed during a simulation.

The input sensor data may comprise fused input sensor data, e.g. combined data from multiple sensors, and/or may comprise sensor data obtained from individual sensors. In both cases, the sensor data typically also includes one or more identifiers indicating the sensor or sensors for which the sensor data provides representative data. This allows received sensor data to be associated with specific sensor or sensors.

The static world representation data comprises information about the real-world area that is static, i.e. does not change, nor is expected to change, when a vehicle controlled by the ACS moves through the real-world area. The static world representation data may for instance comprise information on roads, road markings, traffic signs, viaducts, lamp posts, buildings and/or trees, and may have been sensed by real-world sensors, but may also include map data. The time-series agent movement data may for instance include time-series information on agent position, agent orientation, agent velocity and/or agent acceleration, e.g. as measured by sensors carried by the agent, and may further include routes of vehicles and traffic conditions nearby. Each real-world scenario typically contains information over time of movement of agents in the real-world area, as well as information on static objects in the real-world.

During the simulation of an agent scenario over time, each vehicle agent to which an ACS has been assigned is provided with simulated sensor data about the virtual agents surrounding the vehicle, and with the real-world representation data. The control signals that are output by the ACS may include commands for steering, braking and accelerating the vehicle agent, and/or may include a planned trajectory for the vehicle agent. Generally, the ACS will be adapted for controlling an on-road vehicle, such as a consumer car or a truck.

The simulated scenarios, which may optionally be stored in the virtual scenario database, are based on real-world scenarios so that realistic scenarios are used in the simulation. During simulation, one or more of the ACSs can be implemented in a real vehicle or part of a real vehicle, in which case the ACS is also initialized according to a real-world scenario in the initialization module. In this way the hardware response of the real vehicle, or part of the real vehicle, can be taken into account during the simulation. For instance, a complete real-world vehicle may be arranged on a rolling bench, or may be driven on a test track, while the vehicle is controlled during a simulation using an ACS or an agent movement model. In another example, during the simulation the ACS may control only a part of a real-world vehicle, e.g. the steering hardware, while other parts of the vehicle are simulated in software. If during the simulation an ACS is used to control real-world hardware of an ADS, then the simulation is carried out in real-time. If during the simulation all vehicles to which an ACS has been assigned are virtual only, then typically the simulation can be carried out considerably faster than real-time.

The aggregate safety score may include factors such as exposure, i.e. scenario frequency or occurrence rate derived from real world data, and severity, e.g. does the simulated scenario result in no damage, damage to a vehicle, or injuries to the vehicle's occupants and/or injuries to other agents or road users. The aggregate function may simply be a weighted average of safety scores for the ACS, with the weighing factor for each contributing simulated scenario corresponding to its occurrence rate. In cases in which a specific simulated scenario results in a completely unacceptable safety score, one of the weighing factors may be set to ensure that the total aggregate function result is outside of the predetermined range, and thus ensure that the ACS is not validated as safe.

In an example embodiment, the method further may comprise determining whether a simulated scenario is similar to a virtual scenario that has already been stored in a virtual scenario database which stores simulated scenarios that were carried out earlier using a specific ACS. For instance, the determination may comprise comparing trajectories of agents in both scenarios, and indicating that the two scenarios are similar if for each agent in one scenario there is an agent in the other scenario that follows substantially a same trajectory, and preferably also vice versa. The trajectories include information on position, orientation and velocity of the agent in the real-world area. The scenarios also include static world representation data and static object data as may further include environment conditions such as weather and lighting conditions which typically influence sensor data and agent movement behaviours. Additionally or alternatively, a degree of similarity of two scenarios may be based on the traffic density, e.g. number of moving vehicle agents per unit area or road, and traffic flow, i.e. traffic density per unit time.

In an example embodiment the ACS may be a first ACS, and method may comprise using some or all of the same real-world scenarios to validate the safety of a different second ACS, so that the real-world scenarios can be reused to validate the safety of the second ACS. For instance, the first ACS may be a prior version of the autonomous control software that has been validated as safe and has been installed in a fleet of vehicles, while the second ACS may be a more recent version that is yet to be validated as safe before it is installed in the fleet of vehicles.

In an example embodiment the method may further comprise: based on the real-world scenarios, learning one or more agent movement models, each agent movement model being adapted for dynamically controlling movement of a virtual agent in a simulation; and storing the one or more agent movement models, e.g. in an agent movement model database. Each agent movement model can be assigned to a virtual agent in the simulation, to control movement of the agent based on the information from the simulation as the simulation is being carried out. For instance, a vehicle agent to which one agent movement model has been assigned, may accelerate, steer and/or brake more suddenly than a vehicle agent to which another agent movement model has been assigned. As the agent movement models are learned from real-world agent movements in real-world scenarios, e.g. using machine learning, this typically results in realistic behavior of the virtual agents controlled thereby. As an input, each agent movement model may be provided with all scenario data that is available, which includes information about the other agents and about static objects in the scenario, and preferably includes information such as, location of an agent in the real-world area, time of day, date, surrounding traffic and/or and weather conditions. The input to the agent movement models is not necessarily limited to input sensor data, i.e. during the simulation the kind of information that is input to the agent movement models may be entirely different from the kind of information that is input to the ACS. Based on the input, the agent movement model may generate position and/or orientation at the next time step, a trajectory for one or more further time steps for the agent, or may generate commands to move the agent in the agent scenario, e.g. in case the agent is a vehicle, commands for steering, braking and/or accelerating the virtual vehicle agent in the simulation. The agent movement model may also generate multiple possible trajectories learnt from real world scenarios, or a distribution of possible outputs and choose one for use at this particular occasion in the simulation. The agents can thus interact with each other in the simulation.

For learning the agent movement models typically takes inputs into account that are associated with specific scenarios, such as weather conditions, time of day, date, traffic conditions (e.g. traffic density or variations thereof, traffic flow, average speed, number of lane changes, and so on) and/or location. For instance, a vehicle agent movement model may have learned to accelerate a vehicle agent in a simulation less during rainy conditions than during sunny conditions, and when the agent vehicle is simulated to be moving on an urban road it will typically have different behavior than when it is simulated to be moving on a highway. During simulation, the agent movement models may be provided with these inputs as well.

Preferably, learning the agent movement models also takes into account agent behaviours in the scenarios, and the distributions thereof. During safety validation these distributions can be used when assigning agent movement models to agents in a simulated scenario, so that the distribution of agent movement models in a simulated scenario can correspond to reality. For instance, during learning of agent movement models, it may be determined that 20% of vehicles are speeding, while 80% keep to speed limits. This distribution can then be substantially recreated during initialization of the scenarios that are simulated.

In an example embodiment said initializing the agent movement scenario may further comprise: assigning one or more agent movement models to virtual agents in the simulation to which no ACS is assigned. If an agent movement model is assigned to all agents to which no ACS is assigned, all virtual agents in the simulation are controlled by an ACS or by an agent movement model. If agent movement models are assigned to some of the agents to which no ACS has been assigned, then the remaining agents may be controlled during the simulation to replay movement of their corresponding agents in the real-world scenario upon which the simulation is based.

In this way the safety score that is calculated for a simulated scenario can also include a factor of how agents that are not equipped with an ACS will react in the simulations as well as how the ACS equipped vehicle(s) can deal with the actions and reactions of the surrounding agents. For instance, the safety score would take into account that a sudden braking action by a vehicle agent that is provided with an ACS could result in another agent rear ending the vehicle agent. Preferably, one or more of the agent movement models that are assigned have been learned in accordance with the directly preceding embodiment.

In an example embodiment, the position, and preferably also the orientation, of some of the virtual agents during the entire simulation may be set to be the same as of corresponding agents in the corresponding real-world scenario. In this case, the movement of at least some of the virtual agents is simply a playback of their real-life counterparts.

In an example embodiment the method may further comprise determining, from one or more of the real-world scenarios, ground truth data about dynamic and/or static objects in the real-world area, as well as sensor data sensed by one or more real-world sensors about said dynamic and/or static objects for use as input to the ACS; learning one or more sensor error models based on a difference between the sensed sensor data about the dynamic and/or static objects and the ground truth data about the dynamic and/or static objects; and storing the one or more sensor error models, preferably together with an indication of the real-world sensor type, sensor location, and/or or a unique identification of the respective real-world sensor. Here, the dynamic objects include the real-world agents, and the sensor error model is typically generated using machine learning. The sensor error models and any associated data can for instance be stored in a sensor error model database.

Generally, the received time series data is provided using sensors, e.g. sensors mounted on one or more agents, and/or external sensors, such as road side sensors, which provide data on the position and preferably also orientation of the agent. These sensors are typically susceptible to systemic errors. The ground truth data is data on for example the position and orientation of the agents in the real-world, which is more accurate than the received time-series data. By comparing the ground truth data with the time series data, it is possible to detect systemic errors for each sensor that output part of the time series agent movement data. For instance, a vehicle may provide information about its orientation and position using a GPS sensor, which has a relatively low accuracy, e.g. the position is accurate to within 30 cm and the orientation may be accurate to within 3 degrees, whereas ground truth data about the position and orientation would be significantly more accurate, e.g. based on a high-end sensor system combining radars and lidars or the like. A sensor error model for the GPS sensor can be learned, based on GPS sensor data and the ground truth data. Similarly, sensor error models can be learned for all sensors which provide input to the ACS, such as cameras, radars, lidars, ultrasound sensors, communication sensors (e.g. for V2X communications) and can even be learned for fused sensor data, i.e. for the combined data of several sensors.

The sensor error model can be used both in the real world and in the simulations, to correct agent movement data as measured by sensors of a vehicle (agents) that may be controlled by ACS, or the other agents in its vicinity. Learning of the sensor error models, which is preferably carried out using machine learning, typically takes multiple factors into account, such as velocity of an agent relative to another agent or relative to a static object, time of day, light conditions, temperature, weather, and so on.

In an example embodiment said simulating the agent movement scenario over time may comprise inputting simulated sensor data to each of the vehicle agents to which an ACS has been assigned, wherein said simulated sensor data is based on ground truth data in the simulation and that has been altered based on one or more sensor error models for sensors that provide input to the ACS. This allows the ACS of the virtual vehicle agents to behave more realistically as they are fed with input sensor data that has a similar sensor error as real-world sensor data would have. Thus, even though ground truth data is available, the simulation takes into account systemic errors in sensor data, e.g. from lower-accuracy sensors, that would be provided as input to the ACS in the real-world. The sensor error models may be provided by carrying out learning sensor error models in accordance with the directly preceding example embodiment, or may be provided by other means.

In an example embodiment, when the agent movement scenario is stored, e.g. in a virtual scenario database, also an occurrence rate of the virtual scenario may be stored. Instead of simulating the more frequently occurring scenarios proportionally more frequently than less frequently occurring scenarios, the occurrence rate can be used as a weighing factor for each scenario when calculating the aggregate safety function. Relatively few simulations of virtual scenarios thus have to be carried out in order for the aggregate function of the safety scores to provide a realistic indication of the safety for all agent movement scenarios.

In an example embodiment, the method may comprise determining whether the movement of the virtual agents in the simulated scenarios is consistent with movement of the real-world agents in corresponding real-world scenarios. This can be done by simulating a same scenario setup as used in real-world and then checking whether the results of the real and simulated scenario are consistent. Validating the ACS as safe may also comprise checking whether sufficiently many scenarios have been simulated. To check whether this is the case, it can be monitored whether both the real-world scenario distribution and the simulated agent movement scenario distribution have converged. If one of the distributions has do not converged to within a predetermined degree, then the method does not (yet) have sufficient data, and the ACS is not validated as being safe. Typically, new real-world scenarios are collected at least until a predetermined number of kilometers have been driven by vehicle agents in the real-world scenarios, e.g. more than 200,000 km.

In an example embodiment the method may further comprise carrying out a traffic simulation, using agent movement models, in a simulated area which corresponds to a real-world area;
  marking the agent movement models that are used in the traffic simulation as suitable for use in simulation of scenarios in said area, if traffic conditions in the traffic simulation correspond to within a first predetermined degree to traffic conditions the real-world area; marking the agent movement models that are used in the traffic simulation as unsuitable for use in simulation of scenarios in said area, if the traffic conditions in the traffic simulation do not correspond to within a second predetermined degree to the traffic conditions in said real-world area; wherein in the simulation of the agent movement scenarios in the simulated area no agent movement models that are marked as unsuitable are used.

The traffic simulation has a greater scope than an individual scenario, i.e. the traffic simulation is at a more global scale than individual simulated scenarios and typically relates to a larger real-world area, a greater number of agents, and/or a greater duration of time than a single real-world scenario. By checking whether traffic conditions at a more global scale correspond to real-world traffic conditions, an indication can be obtained of whether agent models that have been learned in more local scenarios are likely to be realistic when applied in the more global traffic simulation. In this manner, a degree of confidence in the realism of the agent movement models can be determined.

For instance, traffic measurements, such as a traffic flow or traffic density, or average travel time for vehicles may be determined for a real-world area, and it can be checked whether the traffic flow, rate of lane changes by vehicles, average distance between vehicles in a same lane, traffic density and/or average travel time and so on, are similar over time in the traffic simulation and in the real world. If that is the case, then the agent movement models used in the traffic simulation are likely to be realistic, and the agent movement models that were used in the traffic simulation are likely suitable to be used in validating an ACS in an agent movement simulation somewhere in the same area.

The traffic flow or traffic density for an area may be obtained through traffic monitoring services. Additionally, or alternatively, Origin Destination (OD) matrices for vehicle agents in a traffic simulation may be compared with OD matrices of vehicles in the real-world to determine whether the two correspond to within the predetermined degree. Several methods for estimating OD matrices are known in the art, e.g. from the report "Origin-Destination matrix estimation from traffic counts", A. G. Hobeika, October 1992. The origin-destination can also be learned from data collection of the real-world vehicles' driving paths.

If the simulated traffic conditions and the real-world traffic conditions correspond to within the first predetermined degree, then the agent movement models are likely suitable to be used in validating an ACS.

If the traffic conditions do no correspond to within the first predetermined degree, this does not necessarily mean that none of the agent movement models is suitable to be used during simulation of an agent movement scenario in the simulated area. It is however likely to mean that one or more of the agent movement models are insufficiently accurate, or that an insufficient number of different agent movement models is available, or that the distribution of agent movement models used in the traffic simulation is not sufficiently correct to accurately reproduce the real traffic conditions.

If the traffic conditions do not correspond to within the first predetermined degree, but it has also not been determined that the traffic conditions do not correspond to within the second predetermined degree, then the way in which the agent movement models are marked depends on other factors, and not all agent movement models should necessarily be marked in the same manner.

If the traffic conditions do not correspond to within the second predetermined degree, then all agent movement models in that traffic simulation are unsuitable for use in a simulated scenario in the real-world area. These agent movement are therefore marked as unsuitable, to prevent them from being used in agent movement scenario simulations in the same area.

Preferably, if it has been determined that traffic conditions in the traffic simulation correspond to traffic conditions in the real-world to within said first predetermined degree, the method further comprises generating further virtual scenarios for use in validation of the ACS, wherein the further virtual scenarios are based on the traffic simulations or parts thereof. Generally, a traffic simulation may include many more vehicles than simulation of a scenario, so that multiple scenarios can be extracted from a single traffic simulation.

In an example embodiment the time-series agent movement data may comprise sensor data received from sensors that are mounted on one or more of said real-world vehicles. Suitable sensors include for example cameras, radars and/or lidars. Preferably, the real-world vehicle(s) equipped with an ACS include the same sensors as used during real-world scenario data collection.

In an example embodiment the method may comprise, prior to said generating the number of agent movement scenarios, receiving static world representation data and time-series agent movement data; identifying, preferably using machine learning, one or more real-world scenarios based on the received static world representation data and the time-series agent movement data, and storing the one or more identified real-world scenarios in the real-world database. The method may thus also include populating the real-world scenario database. Identification of a real-world scenario for instance comprises collecting time series data for a duration of time of 30 seconds to 2 minutes, in which one of the vehicles is selected as a vehicle for which information about the vehicle and its surroundings is collected.

In an example embodiment, the method may comprise converting measurements of non-ground truth data, which comprises measurements of static world representation data regarding a real-world area and measurements of time series agent movement data about one or more real-world agents moving in the real-world area, to estimates of ground truth agent movement scenarios.

Conversion may for instance be carried out using conversion models learned using machine learning such as deep learning, neural networks and so on.

Additionally, or alternatively, estimating the ground truth scenario may comprise one or both of: smoothing the non-ground truth data regarding agent trajectories and the static world representation data over time, e.g. using a smoothing filter; or using models of vehicle agents or other agents to predict movement of these agents, and combining the predictions with the non-ground truth data measurements to obtain the smoothed trajectories.

According to a second aspect, the present invention provides a system for validating autonomous control software, ACS, for operating a vehicle in autonomous driving mode, wherein the ACS is adapted for, based on input sensor data about the surroundings of the vehicle and on static world representation data, outputting control signals for autonomously driving the vehicle, the system comprising:

a real-world scenario database in which a number of real-world scenarios are stored, wherein each real-world scenario is based on static world representation data regarding a real-world area and on time series agent movement data about one or more real-world agents moving in the real-world area, wherein the time series data includes time series data about the position of the agents;

a sampling module adapted for sampling a real-world scenario stored in the real-world scenario database and initializing said sampled scenario with virtual agents in accordance with the sampled real-world scenario, wherein the sampling module is further adapted to assign the ACS to one or more of said real-world or virtual vehicle agents;

a simulation module adapted for carrying out a simulation of the sampled scenario over time and determining a safety score for the ACS in said simulated scenario, wherein said simulating includes providing input sensor data to each vehicle agent to which an ACS has been assigned and wherein movement of each of the other agents in the simulation is controlled to move either according to a replay of a corresponding real-world agent, or by an agent movement model;

a virtual scenario identifier module adapted for determining for said simulated scenario, whether a scenario similar to the simulated scenario is present in a virtual scenario database, and if this is not the case, storing the simulated scenario in said virtual scenario database, and otherwise increasing a counter for the similar virtual scenario in said virtual scenario database; and a validation module, adapted for validating the ACS as safe if an aggregate function of the safety scores for the stored simulated scenarios is within a predetermined range, and otherwise not validating the ACS as safe.

As the system is adapted for carrying out simulations in which an ACS is provided with input sensor data that is likely to be realistic, the realism of simulation is improved which may result in higher accuracy in validation of the ACS as safe to be used in the simulated scenarios or not.

The system is preferably further provided with a storage for storing the result of the aggregate safety function of the safety scores for an ACS together with an identification of the ACS used. This allows aggregate scores for different ACS versions when used in the same initial scenarios to be compared.

In an example embodiment the system may further comprise: an agent movement model learning module adapted for, based on the received time series real-world agent movement data and said world representation data, learning one or more agent movement models, each agent movement model being adapted for dynamically controlling movement of a virtual agent in a simulation. Preferably, the system further comprises an agent movement model database in which the agent movement models that have been learned are stored.

In an embodiment the simulation module is further adapted to, during initialization of each sampled scenario, assign one of said one or more agent movement models to each virtual agent in the simulation to which no ACS is assigned. As described herein before, if an agent movement model is assigned to all agents to which no ACS is assigned, all virtual agents in the simulation are controlled by an ACS or by an agent movement model. If agent movement models are assigned to some of the agents to which no ACS has been assigned, then the remaining agents may be controlled during the simulation to replay movement of their corresponding agents in the real-world scenario upon which the simulation is based.

In an example embodiment the system may further comprise a sensor error model module, adapted for determining, from one or more of the real-world scenarios, ground truth data about dynamic and/or static objects in the real world area, as well as sensor data sensed by one or more real-world sensors about said dynamic and/or static objects for use by the ACS; wherein the sensor error model module is further adapted for: learning one or more sensor error models based on a difference between the sensed sensor data about the dynamic and/or static objects and the ground truth data about the dynamic and/or static objects, and storing the one or more sensor error models, preferably in a sensor error model database. The sensor error model can be used to convert ground truth data to sensor data as would realistically be sensed by real-world sensors, which generally provide data which is less accurate than the ground truth data. As a result, control of an agent vehicle by the ACS based on such (simulated) lower accuracy sensors can be carried out more realistically. Preferably, each sensor error model is stored together with an indication of the real-world sensor type, sensor location, and/or a unique identification of the respective real-world sensor In an example embodiment the one or more virtual vehicle agents to which the ACS has been assigned may have a vehicle type or a unique identification which matches with that of one of said real-world vehicle agents, and wherein in the sampling module is adapted for: assigning one or more of said sensor error models to one or more of said virtual vehicle agents to which the ACS is assigned, and wherein the simulation module is adapted for, during simulation of the sampled scenario, inputting sensor data to each of the virtual vehicle agents to which an ACS has been assigned, wherein said sensor data is based on ground truth data in the simulation that has been altered based on the sensor error model for the virtual vehicle to which the ACS has been assigned. The resulting simulation thus can take systemic sensor errors into account. The sensor error models that are assigned to the virtual vehicle agents are preferably learned in accordance with the directly preceding embodiment, though other types of sensor error models could be used as well.

According to a third aspect, the invention provides a computer readable medium comprising thereon instructions for causing a computer to carry out the method according to the first aspect of the invention.

According to a fourth aspect, the invention provides a computer system comprising a memory and one or more processors, wherein the memory stores instructions which, when carried out by the one or more processors, cause the system to carry of the method according to the first aspect of the invention.

BRIEF DESCRIPTION OF THE DRAWINGS

The invention will be illustrated in the accompanying drawings, in which:

FIG. 1A illustrates a real-world scenario, here shown schematically in top view, in which cars 11, driving on a two-lane road 20 approach a crosswalk 22 that is being crossed by a number of pedestrians 19. The cars 11, 12 and pedestrians 19 are agents that move in the scenario, and FIG. 1A shows the positions and orientation of the agents at a current point in time. The trajectories of the agents prior to the current point in time are indicated by arrows 11a, 12a and 19a, and their trajectories after the current point in time are indicated by arrows 11b, 12b and 19b, so that the scenario comprises time-series data on movement of the agents relative to each other and to static objects such as trees 23, road edges 24, road surface markings 25, traffic lights 26, lamp posts 27, and building 29, which are all shown schematically, and which may be recognized and used by the agents to determine their orientation and position. Next to the two-lane road 20 is a bicycle path 21 for cyclists (not shown), which also has road edges 24. Time series movement data for each of the agents 11, 12, 19 in the scenario has been recorded. The time series movement data includes position and orientation over time of each agent in the scenario, and may also include derivatives thereof such as velocity and acceleration of the agents. The agents that are vehicles, such as cars or trucks, may collect the time series movement data on themselves and/or on other agents in their vicinity, using on-board sensors such as GPS sensors, inertia measurement units, radar, cameras and the like. In the example of FIG. 1A two agents are in the vicinity of each other when there is a direct line of sight between the two agents. Alternatively however, any two agents can be considered to be in the vicinity of each other if they are within a predetermined range from each other, e.g. a range of 50 m if the agents have a velocity of 50 km/h or less and a range of 100 m, or 200 m if the agents have a higher velocity. Movement data of for example pedestrians and cyclists, or even animals, can be collected by the vehicle agents 11, 12. In addition, or alternatively, the time series data on agents 11, 12, 19 may be collected by sensors that are stationary with respect to the real world, such as cameras mounted on or near traffic lights. The agents could also record static world representation data e.g. by recognizing static objects such as buildings and trees.

FIG. 1B illustrates another real-world scenario in which the vehicle agent 11 is driving on a three-lane road 33 and approaches a viaduct 28 that spans over the three-lane road. Vehicle agent 11 collects time-series movement data about itself and further vehicle agents 13, 14 on the same road. The trajectories of the vehicles 11, 13, 14 prior to the current point in time are again indicated by arrows 11a, 13a and 14a, and the future trajectories of the vehicles are indicated by arrows 11b, 13b, 14b.

The movement data of vehicle agent 11 are determined using on-board sensors of the vehicle 11. The vehicle 11 may determine a measure of the position, orientation and velocity of the other vehicles 13, 14 in different ways. For instance, the vehicle 11 may be equipped with sensors for sensing other vehicles, e.g. based on images captured by cameras on the vehicle, and/or based on data collected by one or more radar devices mounted on the vehicle 11. Many kinds of sensors that can be mounted on the vehicle for this purpose will be known to the skilled person. Though such sensors provide an estimate of the agent movement data of vehicles 13, 14, generally the sensed agent movement data will not correspond completely with the actual, or "ground truth" agent movement data of vehicles 13, 14. That is, if sensors on vehicle 11 are used to determine agent movement data of the surrounding vehicles 13, 14, then the sensed data is expected to contain some inaccuracies, due to errors in measurement made by sensors. In FIG. 1B, more ground truth data on the actual position of the vehicles 11, 13 and 14 on the road could for instance be sensed by high resolution cameras 29 mounted above each lane on the viaduct 28.

FIG. 1C illustrates a difference between agent movement data and static object data as sensed by onboard sensors of vehicle 11, and the more accurate ground truth movement data as may be sensed by other higher accuracy sensors. The position of vehicles 13, 14 as sensed by sensors of vehicle 11 is shown in dotted lines indicated by reference numerals 13', 14'. The static objects, including lamp posts 27', road markings 25' and road edges 24' and the like as sensed by the sensors of vehicle 11 are indicated using dotted lines as well. The ground truth position of the vehicles and objects is indicated in full lines using reference numerals 13, 14, 27, 25, 24 and so on. As is to be expected, there is a discrepancy between ground truth data and the data as measured by sensors of vehicle 11. This difference can result in an ACS of vehicle 11 to inaccurately sense that vehicles 13, 14 will follow trajectories 13b' and 14b', instead of the actual trajectories 13b and 14b.

The ground truth movement data may be determined in several different ways, e.g. using external sensors that are stationary in the real world, to provide position and orientation data on vehicle agents 13, 14 with respect to the real world that is more accurate than the position and orientation data on these vehicles as determined by the onboard sensors of the vehicle 11. In any case, the ground truth movement/position data is more accurate than non-ground truth movement/position data.

Another way in which vehicle 11 can obtain ground truth movement data of vehicles 13, 14 is when the movement data is measured by vehicles 13, 14 and is then transmitted to vehicle 11. As these measurements are carried out by sensors on the vehicles 13, 14 themselves they are generally considerably more accurate than the agent movement data measurements for the same vehicles made by the vehicle 11. Throughout this document, measurements which return an actual position of a vehicle, e.g. as measured by the vehicle itself, are referred to as "ground truth" measurements, e.g. ground truth position, orientation and velocity of a vehicle.

Figure 1A:
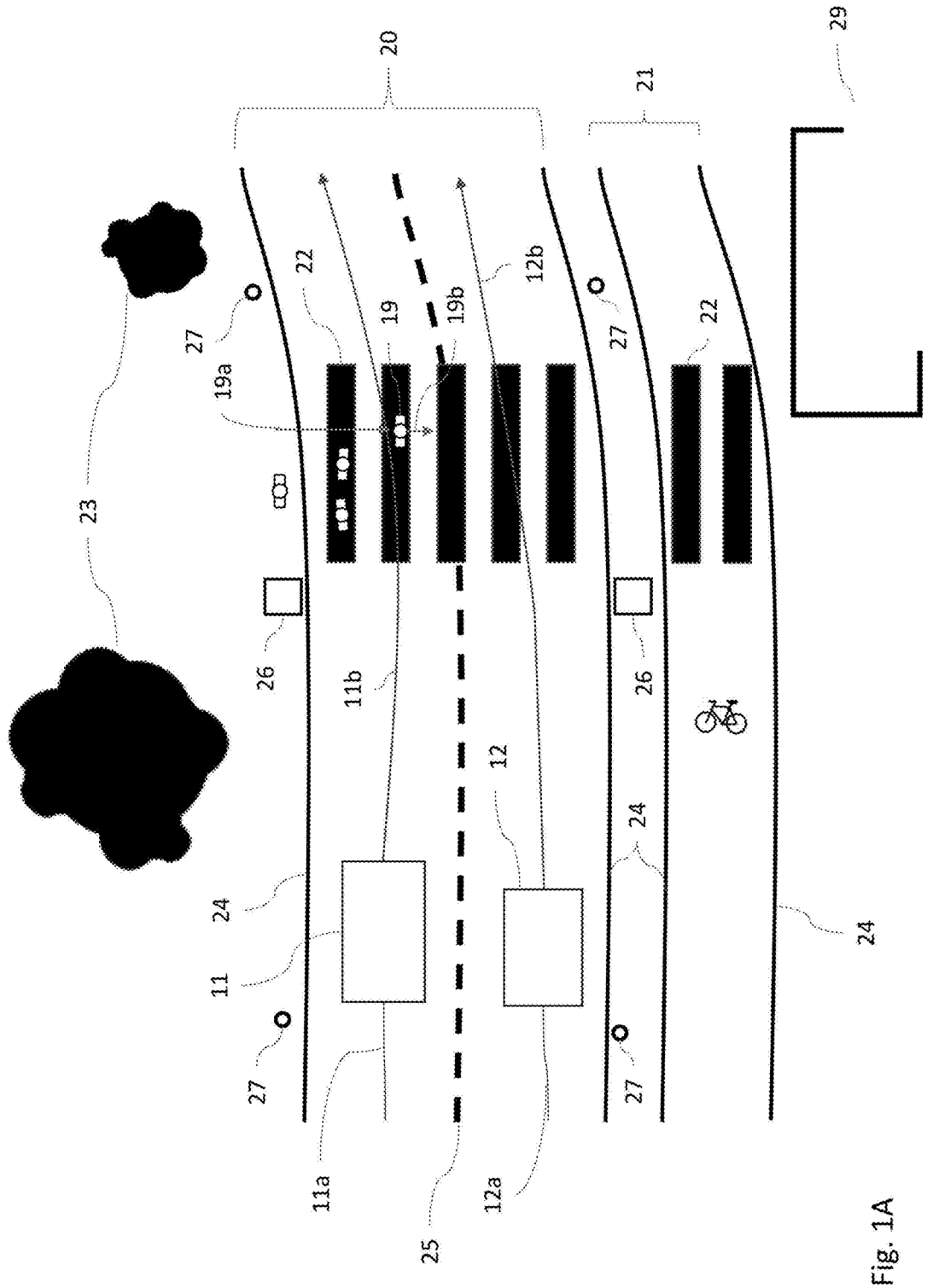
FIG. 1A shows an example of a scenario in an urban area, including time series agent movement data about road-vehicles and pedestrian, as well as static world representation data.
Figure 1B:
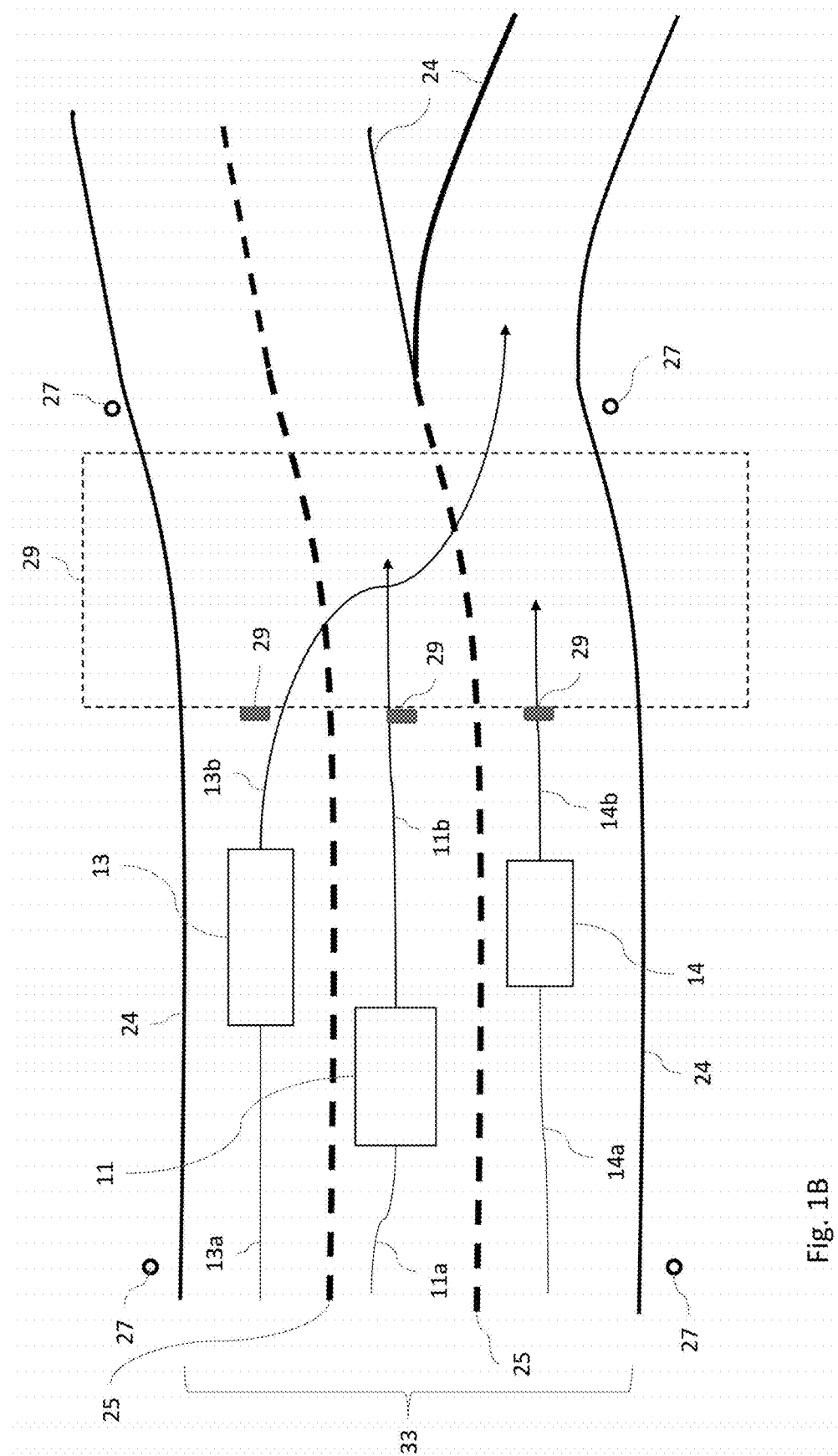
FIG. 1B shows an example of a highway scenario, including time series agent movement data indicative of vehicles changing lanes, as well as static world representation data.
Figure 1C:
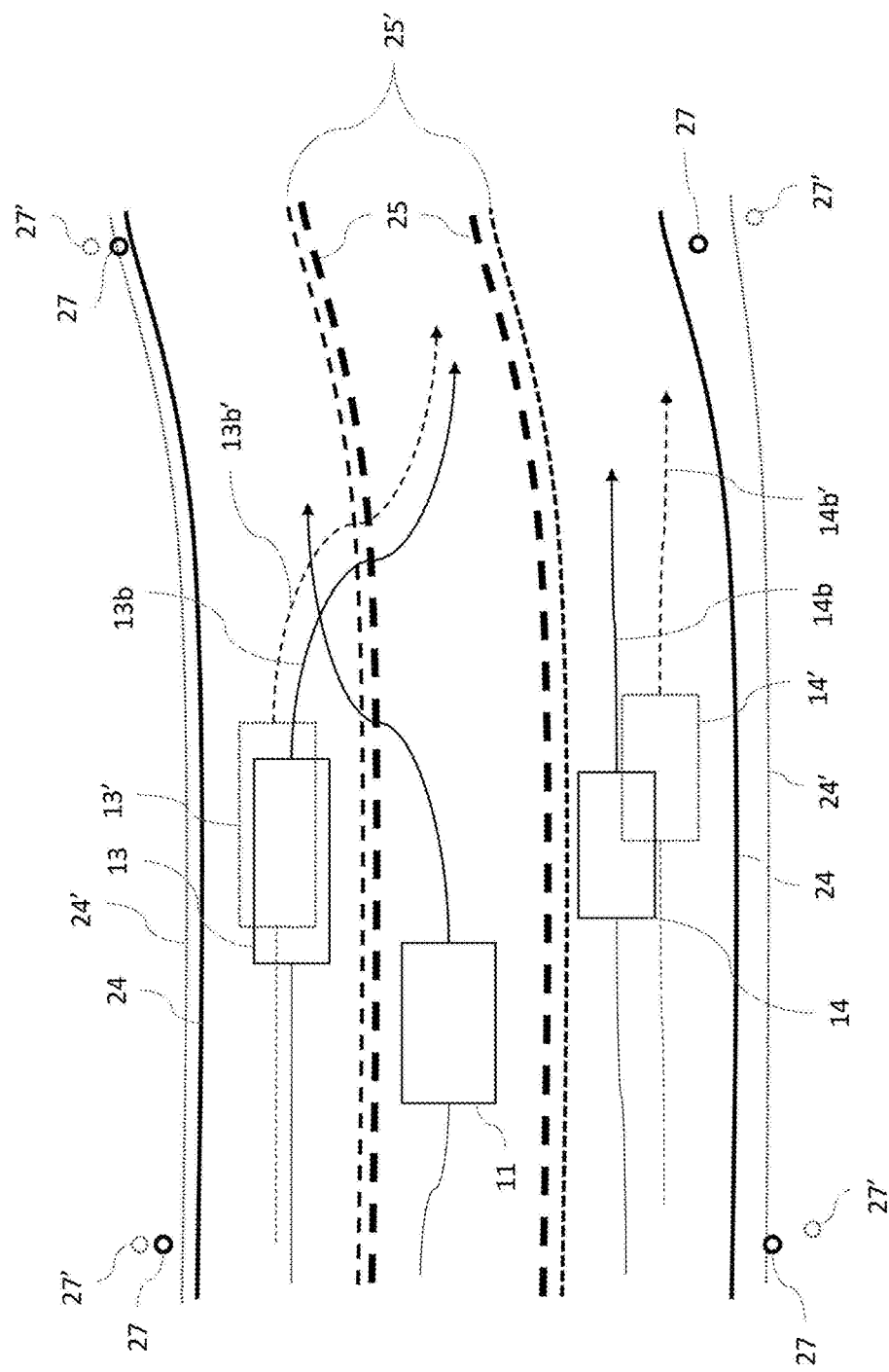
FIG. 1C shows an example of another scenario, illustrating differences between ground truth data and sensor data on objects and vehicles in the scenario.
Figure 2:
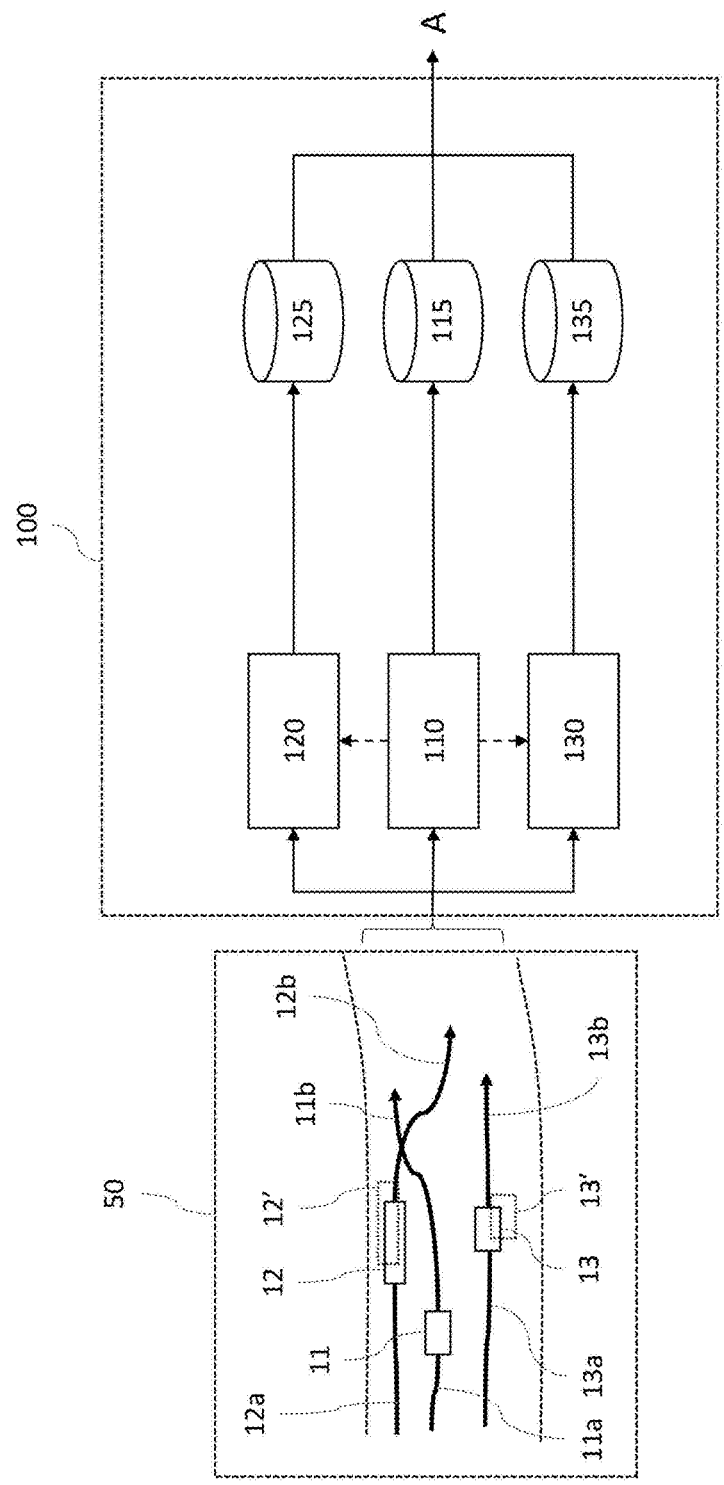
FIG. 2 schematically shows part of a system common to embodiments of the present invention.

FIG. 2 schematically shows a system 100 which takes as an input a real-world scenario 50, which, like the scenarios shown in FIG. 1A, 1B or 10, includes static world representation data regarding the real-world area in which the agents are moving. Such static world representation data may for instance include map data obtained from existing map databases, and data on static objects as sensed by the agents. From this real-world agent movement data and the map and object data, a scenario identifier module 110 of the system 100 identifies a scenario and stores the scenario in a scenario database 115. Scenarios are identified based on overall movement of traffic on the road and includes information on position, velocity and orientation of multiple vehicles on said road relative to each other over time. For instance, FIG. 10 shows a scenario in which vehicles 11 and 13 both change lanes, while vehicle 14 remains in its lane.

Scenario identifier module 110 can use ground truth data to identify scenarios, but could also use less accurate sensor data. The ground truth data for vehicles 12 and 13 may be provided by sensors mounted on these vehicles, which are likely to provide a more accurate data on the position and movement of vehicles 12 and 13 than sensors of vehicle 11 would be able to. Vehicles 12 and 13 may for instance wirelessly transmit their ground truth position and movement data to vehicle 11, while vehicle 11 also captures less accurate position and movement data on vehicles 12 and 13 using sensors of vehicle 11.

However, in many cases it is not feasible, during real-world driving, for the vehicle 11 to obtain ground truth data on all vehicles in its vicinity on the same road, e.g. when only some of the vehicles in the scenario are capable of transmitting such ground truth data, or ground truth data is available for only some of the vehicles. Moreover, even if vehicles such as vehicle 12 and 13 are capable of transmitting their ground truth agent movement data to vehicle 11, there is usually a delay of 10 s of milliseconds or more between sensing the ground truth data at vehicle 12 or 13, and receiving the transmitted ground truth agent movement data at vehicle 11. Such a delay may be too long to ensure that driving decisions for vehicle 11 based on such transmitted data can be taken quick enough to ensure safe automated driving of vehicle 11.

Nonetheless, as long as the ground truth data eventually becomes available, it can be used for validating safety of an ACS later on, as will be explained in more detail below. The scenarios identified by scenario identifier modules 110 are stored in scenario database 115, in order to base simulated scenarios thereon later on in simulations, and may also be used to evaluate the safety of a real-world vehicle in the identified scenario. Each scenario includes road map and object data as well as time-series information on position, velocity and orientation of the vehicles relative to each other and/or to the road. A scenario may additionally include data on objects on or near the road, e.g. road markings on the road, road median strips, bridges, viaducts or railway crossings, and the like.

The real-world agent movement data and map and object data are further input to an agent movement model learning module 120 which, based on this input, learns agent movement models for the vehicles 12, 13 in the scenario and optionally also for vehicle 11. An agent movement model predicts the behaviour of a vehicle on the road, in view of other vehicles and the environment in which it drives. For instance, from the time-series data it may be determined that vehicle 12 generally keeps a distance of at least 2 seconds from a vehicle directly in front of it in the same lane. Also, it might be determined from the time series behaviour of each vehicle how fast or slow each vehicle responds to the other vehicles. For example, in the scenario 50 it could be the case that vehicle 12, which is larger than vehicles 11 and 13, accelerates and brakes more slowly than vehicles 11 and 13. Such driving behaviour can be inferred by the agent movement model learning module, without requiring specific information on the drivers in the vehicles 12, 13. The agent movement models are learned using machine learning, e.g. using a neural networks, deep learning, fuzzy logic, support vector machines and the like, and are stored in agent movement model database 125. Optionally, module 120 receives data about an identified scenario from module 110, to further improve learning by the agent movement learning module.

The real-world agent movement data and map and object data are also input to a sensor error model module 130. Module 130 receives agent movement data of vehicles 12, 13 as sensed by sensors of vehicle 11, as well as ground truth agent movement data as sensed for example by sensors of the vehicles 12, 13 themselves.

By comparing this data with the ground truth agent movement data, the sensor error model module 130 is able to generate a model of the errors in the sensed agent movement data of vehicles 12, 13 as sensed by sensors of vehicle 11. For instance, according to the input 50 in FIG. 2, the sensors of vehicle 11 indicate vehicles 12, 13 to be at a smaller lateral and longitudinal distance from vehicle 11 than they actually are according to the ground truth agent movement data 12', 13' of these vehicles. The sensors errors generally depend on multiple factors, e.g. on speed of the vehicle 11 on which the sensors are mounted, relative location where the sensors sense another vehicle or object, calibration of the sensors, etc. Thus, different sensors of the vehicle 11 typically exhibit different errors under different conditions, and the sensor error model provides a model of the sensor error under such different conditions. The sensor error model can be used for validating the ACS in computer simulations and/or for improving ACS behaviour for the vehicle 11, or vehicles of a same construction, by correcting sensor data that is input into the ACS in correspondence with the determined sensor error model for the vehicle. The sensor error model for vehicle 11 is stored in sensor error model database 135, which also contains sensor error models for a plurality of other vehicles obtained in the same manner. Module 130 may also optionally receive data about an identified scenario from module 110, to further improve learning by the sensor error model module.

Though preferably the real-world vehicle 11 is controlled by an ACS, this is not required; even if none of the vehicles 11, 12, 13 for which real-world agent movement data are collected are provided with an ACS, the collected real-world data can still be used to validate the safety of an ACS. The real-world data that can be retrieved from databases 115, 125 and 135 is indicated by arrow A.

Figure 3:
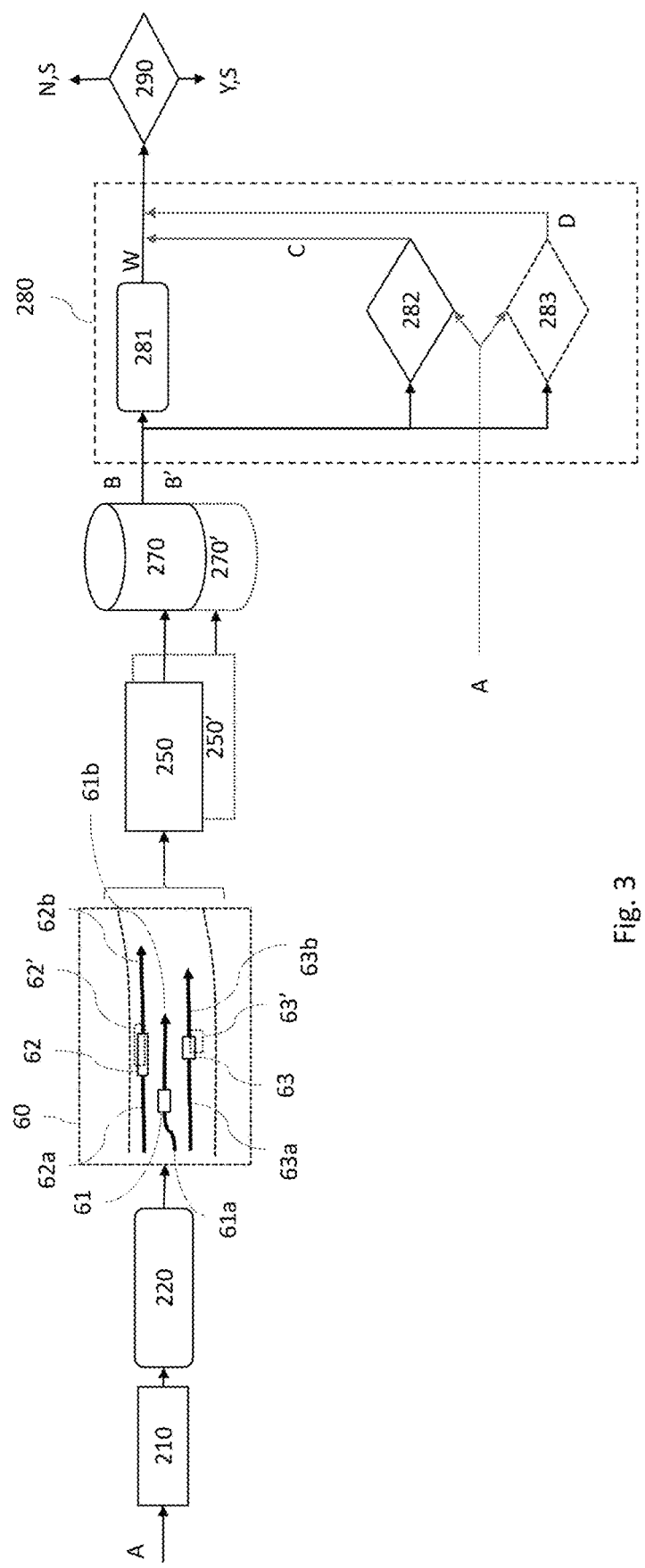
FIG. 3 schematically shows another part of a system which together with the part shown in FIG. 2 forms a first embodiment of the present invention.

FIG. 3 illustrates an optional addition to the system of FIG. 2, in which data A from the databases 115, 125 and 135 is used for validating an ACS, e.g. an ACS as may be used in vehicle 11 or a completely separate ACS. The embodiment of FIG. 3 comprises the system 100 of FIG. 2 and further comprises the modules shown in FIG. 3, with module 210 taking as its input the output A.

In sample module 210 a sample scenario is selected from database 115, the scenario including map information on a road, as well as information on vehicles present on the road at a certain point in time. The scenario may be selected randomly from these databases, but preferably is selected in correspondence with a probability of occurrence of a scenario in the databases. Each scenario in database 115 may be associated with a probability of the scenario occurring in the real world, with this probability stored in the corresponding database. Such a probability may be calculated for a specific scenario, e.g. by determining a number of scenarios in the database that are similar to the specific scenario, divided by the total number of scenario's in the database, extrapolated from real-world scenarios. Additionally, sample module 210 assigns to each agent in the selected scenario an agent movement model from the agent movement model database 125, an ACS to be validated, or sets a flag for the agent that its movement should be a replay of its corresponding agent in the sampled real-world scenario (scenario 50 in FIG. 2). Generally, only one vehicle in a scenario will be assigned an ACS, and the remaining vehicles will be assigned various agent movement models, or their movement will be replayed, though it is also possible to individually assign an ACS to multiple simulated vehicles. Optionally, the sampling module 210 may select a scenario from scenario database 370 shown in FIG. 4, instead of from database 115, in which case the above still applies. Further details will be provided with reference to FIG. 4. The sampling module 210 can also sample from databases 125 and 135 to provide agent movement models and sensor error models if needed.

In simulation module 220 the scenario in which agents have been assigned an agent movement model, an ACS, or have a flag set indicating that the agents should move to replay movement of an agent of the real-world scenario, is initialized in accordance with the selected scenario and subsequently the simulation is carried out over time. The simulation is carried out in or more computers, e.g. in a cloud computing instance or the like, capable of simulating scenarios over time faster than real time. For instance, if it would take 300 to 600 seconds to carry out a scenario in the real world using real on-road vehicles, then it might take one thousands (0,3 to 0,6 seconds) or even less of that amount of time to carry out a simulation of the same scenario using the one or more computers. In FIG. 3, the simulated scenario, indicated using reference numeral 60, shows a vehicle 61 to which an ACS that is to be validated has been assigned, and shows vehicles 62, 63 to which agent movement models from the agent movement model database 125 have been assigned. As can be seen, the simulated scenario differs from the real-world scenario 50 of FIG. 2, e.g. in the simulation 60 there is no lane change by vehicles 61, 62, whereas in the real-world scenario 50 vehicles 11 and 12 change lanes. Nonetheless, the agent movement models of vehicles 12, 13 of FIG. 2 assigned to the simulated vehicles 62, 63 provide a realistic driving behaviour for vehicles 62, 63 in the simulation. It will be appreciated that other agent movement models from the agent movement model database could have been assigned to vehicles 62, 63 instead, and/or that vehicles 62,63 could have been set to replay the movement of vehicles 12, 13 in accordance with the real-world scenario 50. The trajectories of the vehicles 61, 62, 63 over time are indicated by reference numerals 61a, 62a and 63a and 61b, 62b and 63b.

Reference numerals 62',63' are used to indicate the position and orientation data of the simulated vehicles 62, 63 as would be sensed by the simulated sensors of the ACS equipped vehicle. This position and orientation data 62',63' may be determined from the actual position and orientation data of vehicles 62, 63 in the simulation, to which a sensor error model from the sensor error model database 135 is applied. The sensor error model used for this preferably is associated with a real-world vehicle, e.g. corresponds to the sensor error model that has been determined for real-world vehicle 11 of FIG. 2.

Once the entire simulation of the scenario has been carried out, results of the simulation which include the ground truth agent movement data for all vehicles in the simulation, as well as a unique scenario label are input to a scenario identifier module 250, and results of the simulation which include agent movement data as sensed by simulated vehicle 61 are input into scenario identifier module 250'.

Additionally, a degree of similarity of the simulated scenario 60 with scenarios stored in the respective simulated scenario database 270,270' is determined. Many ways of determining a degree of similarity of scenarios will be apparent to the skilled person. A particularly efficient manner to determine such a degree of similarity is to compare trajectories of the vehicles in the simulations, and indicating that two simulations are similar if for each vehicle in one simulation there is a vehicle in the other simulation that follows substantially a same trajectory, and preferably also vice versa. The trajectories include information on position, orientation and velocity of a vehicle on the road over time.

If it is determined that the highest degree of similarity of scenario 60, which includes ground truth agent movement data for all simulated vehicles, to any of the scenarios stored in simulated scenario database 270, is below a predetermined threshold then this simulated scenario is added to the database 270, together with a unique label for scenario 60. If the scenario 60 includes sensed agent movement data for some or all vehicles simulated in the scenario 60, and the highest degree of similarity of scenario 60 to any of the scenarios stored in database 270' is below the predetermined threshold, then the scenario is added to database 270', together with the label. The label forms a cross-reference for scenarios in the databases 270,270' that are based on the same simulated scenario 60.

Database 270 thus contains a set of simulated scenarios, with ground truth agent data for all vehicles in the simulation over time as well as static object data. Database 270' contains a set of simulated scenarios with agent movement data for the vehicles and static objects as sensed by the at least one simulated vehicle to which ACS sensors have been assigned. Arrow B, B' indicates a distribution of the simulated scenarios in databases 270, 270' respectively.

Distribution B, and optionally also distribution B' are input to a validation module 280 for validating the ACS as safe. In safety evaluation submodule 281, for all scenarios in the databases 270,270' one or more safety scores W are determined. Determining the one or more safety scores includes checking whether any of the vehicles to which an ACS was assigned crashed or collided in the simulation, and determining a degree of physical injury to people in the ACS controlled vehicle(s), and typically may also comprise checking physical injuries to other people in the simulation, e.g. pedestrians or people in other vehicles, whether any of the vehicles to which an agent movement model was assigned crashed or collided in the simulation, determining a minimum distance between any two vehicles in the simulation, determining a maximum rate of deceleration of any vehicle in the simulation, determining a peak threat level for the entire simulated scenario, and so on. In module 290 it is checked whether an aggregated function of the safety score for each of the scenarios in which the ACS was assigned to one or more of the simulated vehicles, is within a predetermined range. If yes, then the ACS is validated as safe for use in the real world, and if no, then the ACS is marked as unsafe for use in the real world. The aggregate function for instance may determine a maximum and/or minimum safety score for the scenarios, and/or an average value of the safety scores of all scenarios.

Module 280 further has an optional submodule 282 in which it is checked whether the simulated scenario distributions B and/or B', and the distribution of the real-world scenarios from A stored in database 115 have converged. That is, whether these distributions do not change significantly when further data is added, e.g. when additional data is available on real-world scenarios. Similarly, may be checked that sensor error distributions as well as agent movement distributions have converged. In submodule 282 it is further checked whether simulated scenario distribution B stored in database 270 and/or simulated scenario distribution B' stored in database 270', is consistent respectively with the real-world measured scenario distributions stored in database 115 for a same setup, for example with the same ACS in the scenario and the same number of agents. If this is the case, then the validation can be completed, as it is likely that most relevant scenarios have been simulated. If this is not the case, then it is desirable to carry out further simulations until the simulated scenario distributions are consistent with the measured scenario distributions. The distributions are consistent if for different types of scenarios the real-world scenarios stored in database 115 have a substantially same distribution as the corresponding simulated scenarios of the same type stored in database 270 or 270'. For instance, a type of scenario may include 4 vehicles wherein only vehicle overtakes another vehicle during the scenario. Another type of scenario may include twenty vehicles in a traffic jam, yet another kind of scenario may include a vehicle exiting a lane, and so on.

An indication of whether the scenario distributions in databases 115, 270 (or 270') are consistent is provided as output C. It will be clear that the database 115 will store many different types of scenarios, e.g. at least 10s or 100s of different types.

Module 280 may also include an optional submodule 283 for confirming new scenarios in the real world. A new scenario is a scenario 60 that is not yet present in the real-world database 115, and the learned agent movement and/or sensor error models cannot have taken this new scenario into account during their learning phase. To confirm that sensor error models are correct for new scenario, the sensor response for this scenario can be measured, or simulated. To confirm whether the agent movement models are correct for the new scenario, the new scenario can be tested (i.e. carried out) using real drivers and real vehicles. An indication of whether or not new scenarios are being added to the scenario database is provided as output D.

To test whether the new scenario could occur, the new scenario can be tested in the real world, e.g. by driving an ACS controlled real vehicle on a test track or in a real test vehicle fleet, with surrounding simulated agents behaving as in the new scenario, and feeding simulated sensor data to the real vehicle that is controlled by the ACS behaving as in the new scenario. If the ACS controlled real vehicle cannot reproduce the behaviour of the ACS controlled simulated vehicle, then the ACS and/or the method of validation do not comply with requirements. Otherwise, the new scenario is added to the scenario database.

Besides an indication of whether the ACS is validated as safe or not (i.e. Yes when the ACS is validated as safe, and No if not), module 290 can output a confidence value S which is indicative of the overall confidence score for all contributing scenarios, based on value C and optionally value D for the contributing scenarios. If the outputs C,D from modules 282, 283 indicate that a sufficient number of scenarios has been simulated, and optionally that the underlying simulation models provide reliable results in agreement with real-world results for the same setup, then output S indicates a high confidence value for the aggregated scenarios. Otherwise the output S indicates a low confidence value for the aggregated scenarios. If the confidence value for an aggregate safety score is below a predetermined threshold, then in module 290 the ACS is not validated as safe.

Figure 4:
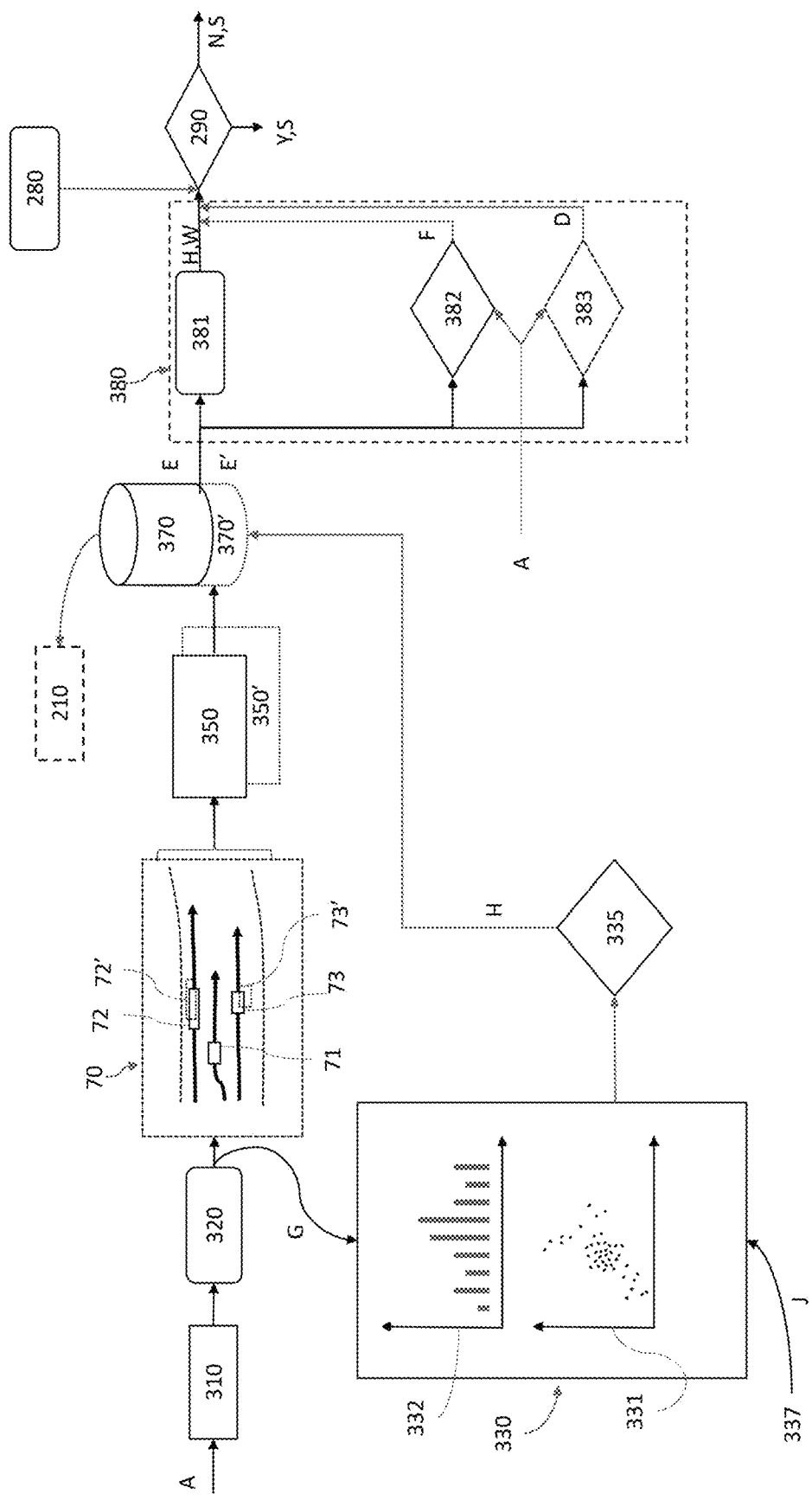
FIG. 4 schematically another part of a system which together with the part shown in FIG. 2 forms o a second embodiment of present invention.

FIG. 4 shows an example of how the data A from FIG. 1B can be used to validate an ACS in another embodiment of the invention. In this embodiment the system 100 of FIG. 2 further comprises the modules shown in FIG. 4, of which modules 350,350',370,370' and 381 and 383 respectively are the same as modules 250,250',270,270',281 and 283 of FIG. 3. However, in FIG. 4 the sampling module takes samples from the agent movement model database 125, the sensor model database 135, and optionally also from the scenario database 115. These samples are not fed to a scenario simulator module 220 as in FIG. 3, but instead are input to a traffic simulator module 320 which outputs a simulation of traffic in a road network over time. Such a traffic simulation can include a larger number of agents than a scenario simulation, allowing aggregate traffic data to be estimated from the traffic simulation. In traffic simulation 70, each vehicle 71, 72, 73 on the simulated road network is controlled to move either according to an ACS or an agent movement model from the database 125. Ground truth agent movement data for vehicles 72, 73 is indicated using rectangles with filled contour, whereas agent movement data for these vehicles as measured by sensors of vehicle 71 is indicated using rectangles with a dashed contour.

The traffic simulator module 320 simulates traffic on a road network that is relevant to where an ACS equipped vehicle, that is to be safety validated, would drive in real world. Based on the simulation, module 320 outputs simulated aggregate data 330 on the traffic in the simulation. The aggregate data comprises measures 331 of flow vs. speed of traffic and for example measures 332 of travel time distributions for vehicles in the simulation, both measures here shown schematically. It will be appreciated that instead of these measures, or in addition, the aggregate data 330 may include information on velocity distributions, queue lengths, intervehicle distances, lane usage e.g. by vehicle type, and/or lane change rate for vehicles in the simulation. The simulated aggregate data is compared with similar real-world aggregate data of traffic measurements J provided by real-world traffic sensors for similar setup in traffic simulation as in real world. The real-world aggregate data is preferably collected at the same time and in the same real-world area as the data for the real-world scenarios. The data for learning the agent movement models and the sensor models are preferably collected at the same time as well. A module 335 compares whether the simulated aggregate data substantially matches with the real-world aggregate data for the same setup, and outputs the result of the comparison as a confidence value H. If the confidence value H is high, the collection of learnt agent movement models is likely complete and the resulting simulated traffic 70 contributing to the aggregated traffic data likely is realistic. The scenarios identified by scenario identifier module 350 are selected to be stored, together with corresponding confidence values H, in the scenario database 370 or 370', and may also be used as input for module 210 in FIG. 3.

Besides safety evaluation submodule 381 and optional module 383 for confirming new scenarios in the real-world, the validation module 380 is further provided with module 382 in which it is checked whether the simulated scenario distribution E stored in database 370 and/or simulated scenario distribution E' stored in database 370', is consistent respectively with the real-world measured scenario distributions stored in database 115 for the same setup. The output F indicates whether this is the case.

If value F from module 382 and value D from module 383 indicate that the distributions of scenarios have converged and are consistent for similar setup, and the value H indicates that the simulated aggregate traffic data 330 reproduces real traffic data measurements for similar setup, then it can be assumed that the simulations were realistic.

In module 290 inputs from module 380 as well as from module 280 are used to calculate an aggregated safety score, as well as the confidence value S therefor. Based on these, module 290 validates the ACS as safe ("Yes") or does not validate the ACS as safe ("No"). In comparison with FIG. 3, now the outputs from traffic simulations are taken into account as well when calculating the aggregated safety score and the confidence score S. Again, if the confidence value S is below a predetermined threshold, then the module 290 does not validate the ACS as safe.

Figure 5:
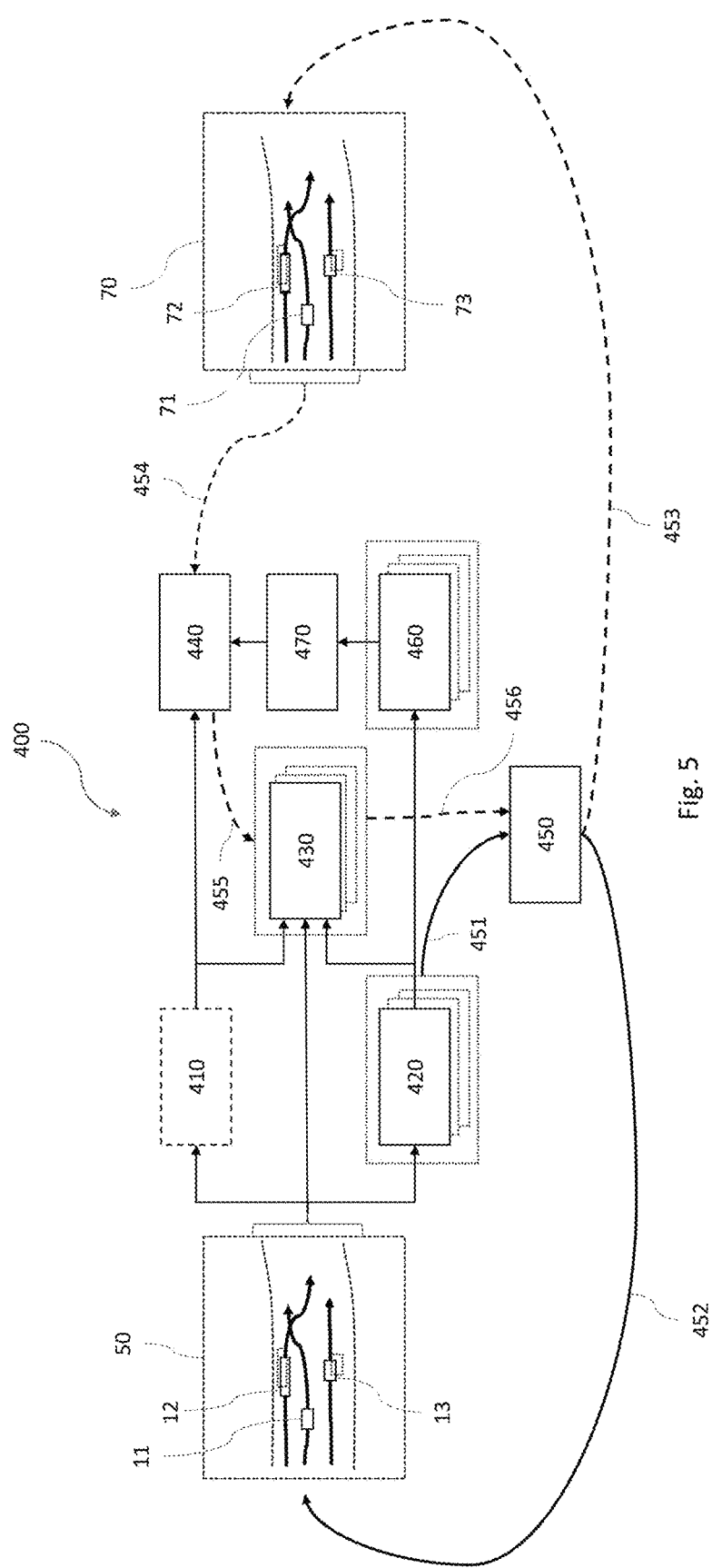
FIG. 5 schematically illustrates how a sensor error model can be determined for sensors of a real-world vehicle, according to the method of the invention.

FIG. 5 schematically shows a system 400 for constructing a sensor error model 430 for a vehicle if ground truth data 410 is available, or for estimating new ground truth scenarios when ground data is unavailable. The sensor error model may be used to verify the accuracy of a simulation 70, using sensor error model for an ACS 450 and information from real-world scenario 50.

The system 400 receives as an input a real-world scenario 50 which includes data 420 as sensed by sensors of vehicle 11, which include agent movement data of vehicles 12, 13, and information on static objects. From the sensed data 420, real-world sensed scenarios 460 are generated. Though vehicle 11 preferably is controlled by an ACS, this is not required. The scenario 50 also contains ground truth data 410 on vehicles 11,12,13 as for example determined by each of those vehicles, from which ground truth scenarios 440 are generated. The accuracy of the ground truth data for vehicles 12, 13, for instance position, orientation and velocity of these vehicles, is higher than corresponding data 420 measured by the sensors of vehicle 11.

Based on a difference between the ground truth data 410 and the lower accuracy sensed data 420, one or more sensor error models 430 are generated for vehicle 11. As both the ground truth data and the data 420 as sensed by sensors of vehicle 11 are available, it is possible to construct a model that can predict systemic measurement errors by the sensors of vehicle 11.

The data 420 as sensed by sensors of vehicle 11 may be input to an ACS 450 in order to control the manner in which real-world vehicle 11 is driven, which in turn affects the real-world scenario 50. There thus is a flow of information, indicated by line 451 including agent movement data 420 as measured by sensors of vehicle 11 to the ACS, and a flow of control signals from the ACS 450, indicated by line 452, for controlling the ADS of real-world vehicle 11 in the real-world scenario 50. The system thus has a feedback loop between the ACS and the real-world vehicle 11.

Line 453 illustrates flow of information comprising control signals from ACS 450 to the simulated scenario 70, for controlling vehicle agent 71 therein.

There may be occasions in which ground truth data 410 is not available from the scenario 50, e.g. when ground truth data for vehicle 11 is not available. In such a case, an estimate of the ground truth scenarios 440 can still be obtained using a converter 470, which converts the sensed real-world scenarios 460 into estimated ground truth scenarios. For instance, the converter could remove noise from the sensed real-world scenarios 460 to create new estimated ground truth scenarios 440 that can be stored in a database. The realism of the estimated new ground truth scenarios may be confirmed in the real world by instructing one or more drivers or an ACS to control a vehicle in a same or similar way as in the estimated ground truth scenario. Based on the estimated ground truth scenario and the sensed scenario, a sensor error model can be generated. Of course, if no ground truth data 410 is available, the sensed real-world scenarios 460 can still be stored in a database.

Line 454 illustrates movement of information from the simulated scenario 70 to the ground truth scenarios 440, line 455 illustrates the sensor error model 430 received input from the ground truth scenarios 440. Line 456 illustrates that the ground truth scenarios 440 of which ground truth sensor data has been modified using a sensor error model 430, is input to the ACS in order to let the ACS control movement of vehicle agent 71 in simulated scenario 70.

It is also possible to compare simulated and real-world results to further validate the simulation, i.e. to check whether the simulation 70 corresponds sufficiently with the real scenario 50 for the same setup. Due to any non-deterministic behaviours, or variation in responses, in one or several components building up the system e.g. in the sensor, there will be a spread in the results in real-world as well as in the simulation. The corresponding distributions of results in the simulated and real-worlds preferably agree for the equivalent setups to within a predefined extent.

Figure 6:
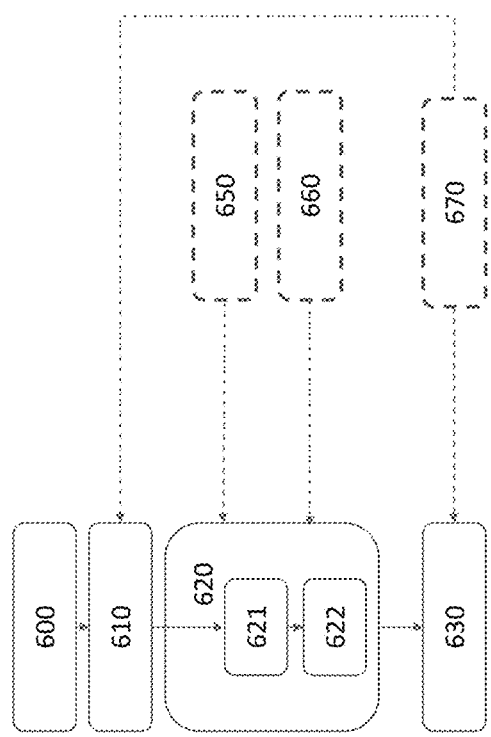
FIG. 6 shows a flow chart of the method of the invention.

FIG. 6 schematically shows a flow-chart of a method according to the invention.

In step 600 a plurality of real-world scenario is retrieved from a database, wherein each real-world scenario is based on static world representation data regarding a real-world area. This data may for example include map data and data about road markings, buildings and the like in the predetermined are. Each real-world scenario is further based on time series agent movement data about one or more real-world agents moving in the real-world area, wherein the real-world agents include one or more real-world vehicle agents.

In step 610 a number of agent movement scenarios are generated based on the real-world scenarios, wherein each agent movement scenario comprises the static world representation data of a corresponding real-world scenario.

In step 620, a simulation is carried out for each of the agent movement scenarios. This includes a sub-step 621 of initializing each agent movement scenario with virtual agents in accordance with a real-world scenario sampled from the real-world scenario database, and assigning the ACS to one or more of said real-world or virtual vehicle agents to control driving behavior thereof in the simulation;

Step 620 includes a subsequent sub-step 622 of simulating the virtual agent movement scenario over time and determining a safety score for the simulated virtual agent movement scenario in which the ACS is used, wherein said simulating includes providing input sensor data to each vehicle agent in the simulation to which an ACS has been assigned; and wherein movement of each of the other agents in the simulation is controlled to move either according to a replay of a corresponding real-world agent, or by an agent movement model;

In step 630, an aggregate safety score for the ACS is calculated using an aggregate safety function of the safety scores of all the simulated scenarios. The ACS is only validated as safe if the aggregate safety score is within a predetermined range.

Though not shown, the method may comprise an optional further step 650 of using and/or learning sensor error models, or optional step 660 of using and/or learning agent movement models, as described earlier herein, wherein the sensor error models and/or agent movement models are used during the simulation. Further optionally, the method may comprise a step 670 of carrying out a traffic simulation, as described herein earlier, and using the result of the traffic simulation in determining the aggregate safety score, and/or for generating additional agent movement scenarios.

In summary, the invention provides a method and system for validating an automated control software, ACS, for a vehicle, wherein the ACS is adapted for operating a vehicle in autonomous driving mode. The method comprises simulating use of the ACS in agent movement scenarios, wherein said simulating includes providing input sensor data to each vehicle agent to which an ACS has been assigned, and wherein movement of each of the other agents in the simulation is controlled to move either according to a replay of a corresponding real-world agent, or by an agent movement model.

The invention claimed is:

1. A method for validating autonomous control software (ACS) for operating a vehicle in autonomous driving mode, the method comprising:
training, by a system comprising a processor, via machine learning, using real-world scenarios, agent movement models, respectively representing real-world agents in the real-world, to control operations of virtual agents corresponding to the real-world agents, wherein each real-world scenario is based on static world representation data representing static objects in a real-world area and on time series agent movement data representing the real-world agents moving in the real-world area, wherein the real-world agents comprise vehicles, wherein the time series agent movement data comprises time series data about positions of the real-world agents;

based on the real-world scenarios, generating, by the system, agent movement scenarios, wherein each agent movement scenario comprises the static world representation data of a corresponding real-world scenario; and executing, by the system, a simulation of each agent movement scenario of the agent movement scenarios, wherein the executing comprises, for each simulation:
  initializing the agent movement scenario with a group of virtual agents corresponding to a group of real-world agents in accordance with a real-world scenario sampled from the real-world scenario database,
  assigning agent movement models respectively to a sub-group of the virtual agents, wherein the agent movement models respectively correspond to the real-world agents corresponding to the sub-group of virtual agents, and wherein the agent movement models respectively control operations of the sub-group group of virtual agents during the simulation, and
  assigning the ACS to the vehicle to control driving of the vehicle in the real-world during the simulation or to a virtual agent corresponding to the vehicle to control driving of the virtual agent during the simulation, and
  simulating the agent movement scenario over a period of time using the agent movement models and the ACS, wherein an agent movement model of the agent movement models determines a plurality of possible operations for a virtual agent associated with the agent movement model based upon operations of at least one of the vehicle or the other virtual agents, and the agent movement model selects an operation of the plurality of possible operations for the virtual agent to perform, and wherein the simulating comprises providing input sensor data to the ACS,
  determining, by the system, a safety score for the ACS for the simulated agent movement scenario; and
validating, by the system, the ACS, wherein validating comprises:
  in response to an aggregate function of the safety scores for the ACS for the simulated agent movement scenarios being determined to satisfy a criterion, validating the ACS as safe, and
  in response to the aggregate function of the safety scores for the ACS for the simulated agent movement scenarios being determined not to satisfy the criterion, not validating the ACS as safe.

2. The method of claim 1, wherein the vehicles comprise at least one of a car, a truck, a bus, a motorcycle, or a bicycle.

3. The method of claim 1, wherein the real-world agents further comprise at least one of a pedestrian or an animal.

4. The method of claim 1, further comprising:
determining, by the system, from one or more of the real-world scenarios, ground truth data about at least one of dynamic objects or static objects in the real-world area, and sensor data, sensed by one or more real-world sensors, about the at least one of dynamic objects or static objects;

training, by the system, via the machine learning, one or more sensor error models based on differences between the sensor data and the ground truth data; and storing, by the system, the one or more sensor error models, and indications of at least one of sensor types of the real-world sensors, sensor locations of the real-world sensors, or unique identifiers of the real-world sensors.

5. The method of claim 1, wherein the input sensor data comprises the sensor data that has been altered based on the one or more sensor error models.

6. The method of claim 1, further comprising determining, by the system, whether movement of the virtual agents in the simulated agent movement scenarios is consistent with movement of the corresponding real-world agents in corresponding real-world scenarios.

7. The method of claim 1, wherein the time-series agent movement data is based on sensor data received from sensors that are mounted on one or more of the real-world agents, and wherein the static world representation data is based on the sensor data.

8. The method of claim 1, further comprising, prior to said generating the agent movement scenarios:
receiving, by the system, the static world representation data and the time-series agent movement data;
identifying, by the system, via the machine learning, the real-world scenarios based on the static world representation data and the time-series agent movement data.

9. The method of claim 1, further comprising
marking, by the system, the agent movement models that are used in the simulation of the agent movement scenario in the real-world area as suitable for use in the simulation of the agent movement scenario in the real-world area, in response to determining that traffic conditions in the simulation of the agent movement scenario in the real-world area corresponds within a predetermined degree to traffic conditions in the real-world area; and
marking, by the system, the agent movement models that are used in the simulation of the agent movement scenario in the real-world area as unsuitable for use in the simulation of the agent movement scenario in the real-world area, in response to determining that the traffic conditions in the of the agent movement scenario in the real-world area do not correspond within the predetermined degree to the traffic conditions in the real-world area.

10. The method of claim 1, wherein the executing, for each simulation, further comprises operating virtual agents that are not assigned agent movement models according to respective replays of corresponding real-world agents in the corresponding real-world scenario.

11. A system for validating autonomous control software (ACS) for operating a vehicle in autonomous driving mode, the system comprising:
a processor, communicatively coupled to a memory that stores computer-executable instructions, that executes or facilitates execution of the computer-executable instructions to perform operations, comprising:
training, via machine learning, using real-world scenarios, agent movement models, respectively representing real-world agents in the real-world, to control operations of virtual agents corresponding to the real-world agents, wherein each real-world scenario is based on static world representation data representing static objects in a real-world area and on time series agent movement data representing the real-world agents moving in the real-world area, wherein the real-world agents comprise vehicles, wherein the time series agent movement data comprises time series data about positions of the real-world agents;
based on the real-world scenarios, generating agent movement scenarios, wherein each agent movement scenario comprises the static world representation data of a corresponding real-world scenario; and
executing a simulation of each agent movement scenario of the agent movement scenarios, wherein the executing comprises, for each simulation:
  initializing the agent movement scenario with a group of virtual agents corresponding to a group of real-world agents in accordance with a real-world scenario sampled from the real-world scenario database,
  assigning agent movement models respectively to a sub-group of the virtual agents, wherein the agent movement models respectively correspond to the real-world agents corresponding to the sub-group of virtual agents, and wherein the agent movement models respectively control operations of the sub-group of virtual agents during the simulation, and
  assigning the ACS to the vehicle to control driving of the vehicle in the real-world during the simulation or to a virtual agent corresponding to the vehicle to control driving of the virtual agent during the simulation, and
  simulating the agent movement scenario over a period of time using the agent movement models and the ACS, wherein an agent movement model of the agent movement models determines a plurality of possible operations for a virtual agent associated with the agent movement model based upon operations of at least one of the vehicle or the other virtual agents, and the agent movement model selects an operation of the plurality of possible operations for the virtual agent to perform, and wherein the simulating comprises providing input sensor data to the ACS,
  determining a safety score for the ACS for the simulated agent movement scenario; and
  validating the ACS, wherein validating comprises:
    in response to an aggregate function of the safety scores for the ACS for the simulated agent movement scenarios being determined to satisfy a criterion, validating the ACS as safe, and
    in response to the aggregate function of the safety scores for the ACS for the simulated agent movement scenarios being determined not to satisfy the criterion, not validating the ACS as safe.

12. The system of claim 11, wherein the vehicles comprise at least one of a car, a truck, a bus, a motorcycle, or a bicycle.

13. The system of claim 11, wherein the real-world agents further comprise at least one of a pedestrian or an animal.

14. The system of claim 11, wherein the operations further comprise:
determining, from one or more of the real-world scenarios, ground truth data about at least one of dynamic objects or static objects in the real-world area, and sensor data, sensed by one or more real-world sensors, about the at least one of dynamic objects or static objects;
training, via the machine learning, one or more sensor error models based on differences between the sensor data and the ground truth data; and
storing the one or more sensor error models, and indications of at least one of sensor types of the real-world sensors, sensor locations of the real-world sensors, or unique identifiers of the real-world sensors.

15. The system of claim 14, wherein the input sensor data comprises the sensor data that has been altered based on the one or more sensor error models.

16. The system of claim 11, wherein the executing, for each simulation, further comprises operating virtual agents that are not assigned agent movement models according to respective replays of corresponding real-world agents in the corresponding real-world scenario.

17. A non-transitory computer-readable medium having instructions stored thereon that, in response to execution, cause a system comprising a processor to perform operations for validating autonomous control software (ACS), comprising:
training, via machine learning, using real-world scenarios, agent movement models, respectively representing real-world agents in the real-world, to control operations of virtual agents corresponding to the real-world agents, wherein each real-world scenario is based on static world representation data representing static objects in a real-world area and on time series agent movement data representing the real-world agents moving in the real-world area, wherein the real-world agents comprise vehicles, wherein the time series agent movement data comprises time series data about positions of the real-world agents;
based on the real-world scenarios, generating agent movement scenarios, wherein each agent movement scenario comprises the static world representation data of a corresponding real-world scenario; and
executing a simulation of each agent movement scenario of the agent movement scenarios, wherein the executing comprises, for each simulation:
  initializing the agent movement scenario with a group of virtual agents corresponding to a group of real-world agents in accordance with a real-world scenario sampled from the real-world scenario database,
  assigning agent movement models respectively to a sub-group of the virtual agents, wherein the agent movement models respectively correspond to the real-world agents corresponding to the sub-group of virtual agents, and wherein the agent movement models respectively control operations of the sub-group of virtual agents during the simulation, and
  assigning the ACS to the vehicle to control driving of the vehicle in the real-world during the simulation or to a virtual agent corresponding to the vehicle to control driving of the virtual agent during the simulation, and
  simulating the agent movement scenario over a period of time using the agent movement models and the ACS, wherein an agent movement model of the agent movement models determines a plurality of possible operations for a virtual agent associated with the agent movement model based upon operations of at least one of the vehicle or the other virtual agents, and the agent movement model selects an operation of the plurality of possible operations for the virtual agent to perform, and wherein the simulating comprises providing input sensor data to the ACS,
  determining a safety score for the ACS for the simulated agent movement scenario; and
  validating the ACS, wherein validating comprises:

in response to an aggregate function of the safety scores for the ACS for the simulated agent movement scenarios being determined to satisfy a criterion, validating the ACS as safe, and in response to the aggregate function of the safety scores for the ACS for the simulated agent movement scenarios being determined not to satisfy the criterion, not validating the ACS as safe.

18. The system of claim 17, wherein the vehicles comprise at least one of a car, a truck, a bus, a motorcycle, or a bicycle.

19. The system of claim 17, wherein the real-world agents further comprise at least one of a pedestrian or an animal.

20. The system of claim 17, wherein the executing, for each simulation, further comprises operating virtual agents that are not assigned agent movement models according to respective replays of corresponding real-world agents in the corresponding real-world scenario.

* * * * *